United States Patent [19]

Mochida et al.

[11] Patent Number: 4,673,294
[45] Date of Patent: Jun. 16, 1987

[54] FILM THICKNESS MEASURING APPARATUS EMPLOYING MICROPROJECTOR OF SPECTRAL REFLECTION MEASUREMENT

[75] Inventors: Yoshihiro Mochida, Oume; Nobuo Adachi, Sagamihara; Ichiro Shirahama, Chofu, all of Japan

[73] Assignee: ORC Manufacturing Co., Ltd., Tokyo, Japan

[21] Appl. No.: 723,567

[22] Filed: Apr. 15, 1985

[30] Foreign Application Priority Data

Sep. 20, 1984 [JP] Japan .............................. 59-142398[U]

[51] Int. Cl.⁴ ............................................ G01B 11/06
[52] U.S. Cl. .................................... 356/381; 356/391
[58] Field of Search ................ 250/560; 356/153, 219, 356/381, 382, 391, 392, 393

[56] References Cited

U.S. PATENT DOCUMENTS 3,827,811  8/1974  Kato et al. ..................... 356/219 X
3,851,949 12/1974  Kraft et al. .................... 356/219 X
3,869,211  3/1975  Watanabe et al. .............. 250/560 X
4,355,903 10/1982  Sandercork .................... 356/382

*Primary Examiner*—Eugene R. LaRoche
*Assistant Examiner*—James C. Lee
*Attorney, Agent, or Firm*—Cushman, Darby & Cushman

[57] ABSTRACT

A film thickness measuring apparatus comprising an optical measuring system and an optical projecting system is disclosed. The conventional optical measuring system includes a light source, a first optical system, a monochromator, a second optical system and a photomultiplier tube andmonochromatic light is emitted from the first optical system toward the surface of the film layer on a material of which film thickness is to be measured. While reflection interference takes place between light reflected at the surface of the film layer and light reflected at the base plate, reflected light beam is transmitted to the photomultiplier tube via a semi-transparent mirror so that the thickness of the film layer is measured. Before measuring of the film thickness is initiated, there is necessity for determining the correct position of the material to be measured. To this end the optical projecting system includes a third optical system adapted to emit light toward the surface of the film layer via a turnable mirror and reflected light is then transmitted to a screen via the turnable mirror so as to visually observe an image of the material in an enlarged scale. Thus, when film thickness is to be measured, the turnable mirror is caused to assume the inoperative position by turning operation.

5 Claims, 4 Drawing Figures

FILM THICKNESS MEASURING APPARATUS EMPLOYING MICROPROJECTOR OF SPECTRAL REFLECTION MEASUREMENT

BACKGROUND OF THE INVENTION

1. Field of the Invention

The present invention relates to a film thickness measuring apparatus and more particularly to an apparatus for measuring the thickness of a layer of film on certain material with the use of spectral reflectivity.

2. Description of the Prior Art

To facilitate understanding of the present invention it will be helpful to briefly describe a typical conventional film thickness measuring apparatus of the above-mentioned type below with reference to FIGS. 3 and 4. In these drawings reference numeral 10 generally designates a film thickness measuring apparatus. The film thickness measuring apparatus 10 includes a light source 9, an objective lens system 11, a monochrometer 17, and a photomultiplier tube 19. A microscope 12 which is intended to visually observe the surface of the film layer on the material 16 placed on the sample stage 14 by using an eyepiece 13 and a prism 15.

Incidentally, reference numeral 18 designates a housing section in which the optical measuring system is incorporated.

However, it has been pointed out as a drawback inherent to the conventional film thickness measuring apparatus that an operator should visually observe the surface of the film layer on the material through the eyepiece 13 of the microscope 12 every time film thickness is to be measured and thereby measuring of film thickness can be achieved with necessity for an excessively long period of time.

SUMMARY OF THE INVENTION

Hence, the present invention has been made with the foregoing problem in mind and its object resides in providing an improved film thickness measuring apparatus which assures that visual observation of a material of which film thickness is to be measured can be carried out easily by utilizing an optical projecting system without any necessity for repeated focussing operation at a time when the optical measuring system is to be shifted to the optical projecting system.

To accomplish the above object there is proposed according to the invention an apparatus for measuring the thickness of a film on certain material placed on the sample stage essentially comprising a first light source for generating light beam to be emitted, a first optical system for collecting thus emitted light beam, a monochromator for spectrally transform thus collected light beam in the first optical system to monochromatic light, a second optical system for allowing monochromatic light to be emitted toward the surface of the film layer on the material, a photomultiplier tube for outputting photoelectric current in proportion to the intensity of incident light transmitted from the surface of the film layer and an optical projecting system which comprises a third optical system optically associated with the second optical system, a second light source which is provided in the third optical system adapted to emit light beam toward the surface of the film layer and a viewer for projecting an image of the film layer on the material in an enlarged scale by utilizing reflected light transmitted from the surface of the film layer.

Practically, the present invention consists in a combination of conventional optical measuring system and optical projecting system. To utilize the optical projecting system the apparatus is provided with a turnable mirror disposed at a predetermined position in the second optical system where the optical axis of the first optical system is intersected with the optical axis of the optical projecting system at a right angle relative to the latter whereby the optical projecting system is optically associated with the second optical system which constitutes the optical measuring system.

Usually, the turnable mirror is actuated by means of a motor which is located outside the optical measuring system.

The turnable mirror is actuated in such a manner that the optical axis of the first optical system is oriented toward the film layer on the material when film thickness is to be measured. Further, the turnable mirror is actuated in such a manner that the optical axis of the optical projecting system is intersected with the optical axis of the optical measuring system at a right angle relative to the latter when an image of the film layer is to be projected on a screen of the viewer.

Other objects, features and advantages of the present invention will be some more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which illustrate a preferred embodiment thereof.

Figure 1:
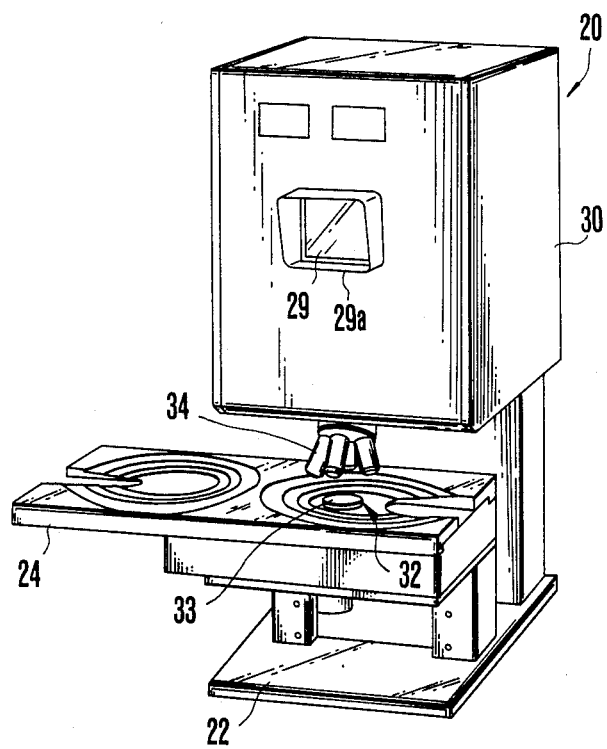
FIG. 1 is a perspective view of a film thickness measuring apparatus according to an embodiment of the present invention.
Figure 2:
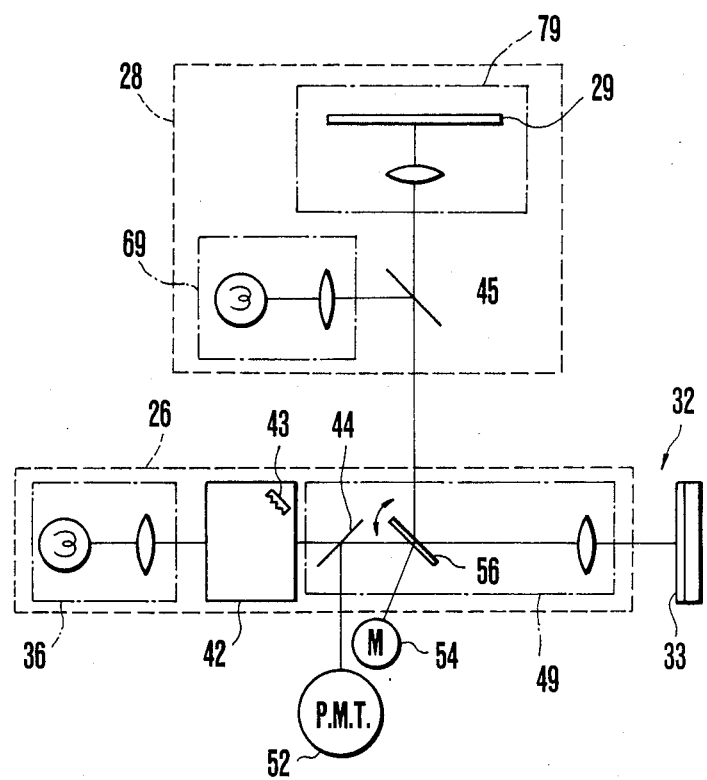
FIG. 2 is a block diagram schematically illustrating the structure of the apparatus in FIG. 1.
Figure 3:
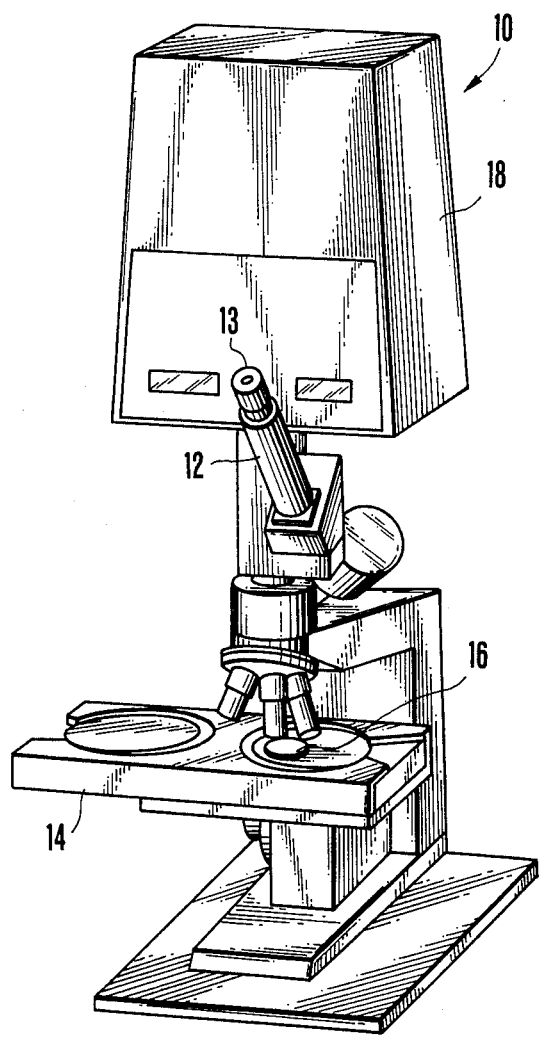
FIG. 3 is a perspective view of a typical conventional film thickness measuring apparatus.
Figure 4:
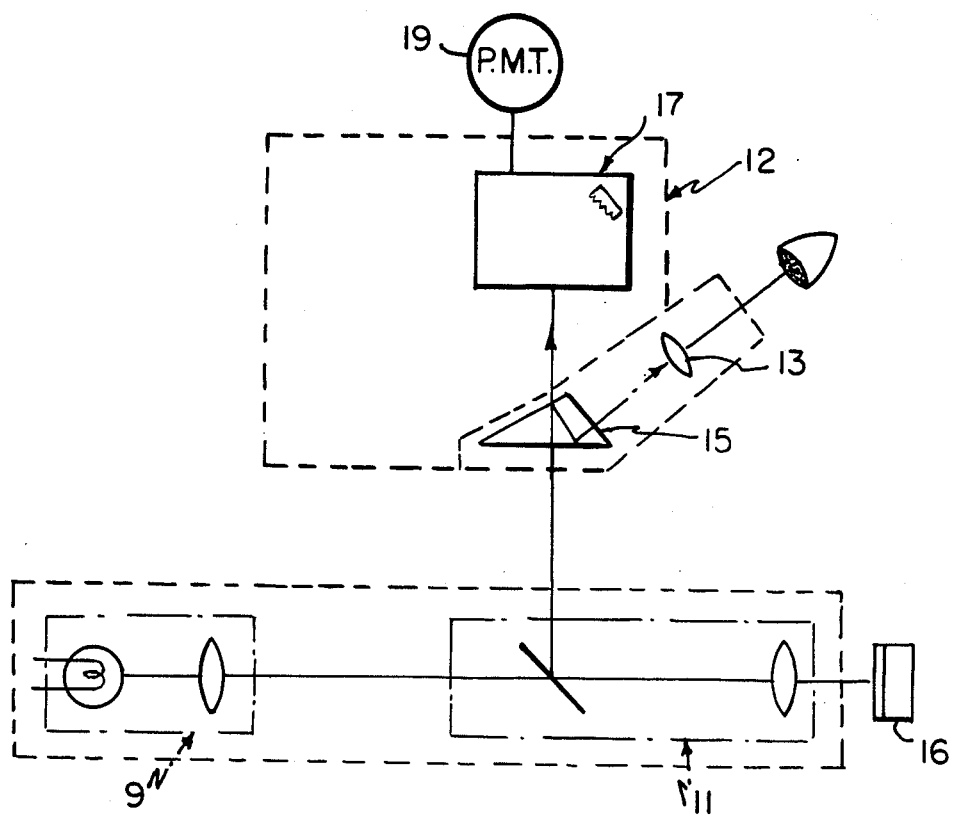
FIG. 4 is a block diagram schematically illustrating the structure of the apparatus in FIG. 3.

FIGS. 1 and 2 schematically illustrate a film thickness measuring apparatus according to an embodiment of the invention, wherein FIG. 1 is a perspective view of the apparatus and FIG. 2 is a block diagram of the same.

First, referring to FIG. 1, reference numeral 20 generally designates a film thickness measuring apparatus (hereinafter referred to simply as apparatus). Specifically, the apparatus 20 includes a base plate 22, a sample stage 24 located above the base plate 22, an optical measuring system 26 to be described later, the optical measuring system 26 being disposed on the base plate 22, and a housing section 30 with a optical projecting system 28 incorporated therein. As is apparent from the drawing, a screen 29 with a hood attached thereto for the optical projecting system 28 is provided on the front surface of the housing section 30. The screen 29 is so designed that an image of the surface of the film layer 33 on a material 32 of which film thickness is to be measured is projected on the screen 29 in an enlarged scale. Thus, an operator can visually observe the surface of the film layer 33 via an objective lens 34 to determine the correct position of the material 32. Incidentally, the material 32 to be measured is placed on the sample stage 24 and a magnification of the objective lens 34 can be changed as required.

Next, preferring to FIG. 2 which schematically illustrates also the structure of the optical measuring system 26, reference numeral 36 designates a first optical system for emitting monochromatic light toward the surface of the film layer 33 on the material 32. White light which has been emitted through the first optical system 36 is adapted to enter the monochromator 42.

Specifically, the monochromator 42 is provided with a rotatable diffraction grating 43 so that scanning of wavelength of the thus introduced light can be effected by changing an inclination angle of the rotatable diffraction grating 43.

The monochromator 42 spectrally transforms the thus introduced light to monochromatic light which is in turn emitted toward the surface of the film layer 33 on the material 32 via a second optical system 49 which comprises a semi-transparent mirror 44, a turnable reflective mirror 56 and an objective lens.

Monochromatic light is then reflected at the material 32 in the form of reflected light with which optical interference takes place between light beam coming from the surface of the film layer 33 and light beam coming from the surface of the base plate and the thus reflected light is then caused to pass through the second optical system 49 again. Thereafter, it is reflected downwardly at the semi-transparent mirror 44 to be introduced into a photomultiplier tube 52. The latter is adapted to generate an intensity of photoelectric current in proportion to the intensity of incident light so that film thickness of the material 32 can be measured by utilizing the intensity of reflection from the film layer.

Next, description will be made below as to the optical projecting system 28 constituting an essential part of the invention.

The second optical system 49 is provided with a turnable mirror 56 adapted to be actuated by means of a motor which is disposed behind the second optical system 49 as seen in the drawing under control from the outside. When measuring of film thickness is to be effected, the mirror 56 is caused to turn in the direction (as identified by chain lines in FIG. 2) until the optical axis of the optical measuring system 26 is directed toward the surface of the material 32. On the other hand, when the surface of the film layer 33 is to be visually observed on the screen 29, the mirror 56 is caused to turn in the direction (as identified by real lines in the drawing) until reflected light is aligned with the optical axis of the optical projecting system 28.

As illustrated in FIG. 2, a third optical system 69 including light source for emitting light beam toward the film layer 33 during visual observation and light collecting lenses are arranged above the turnable mirror 56. Light beam emitted from the third optical system 69 reaches the turnable mirror 56 via a semi-transparent mirror 45 and it is then transmitted to the surface of the film layer 33 on the material 32 through the second optical system 49.

Thus transmitted light is reflected on the film layer 33 on the material 32 and reflected light is then transmitted to the screen 29 via the second optical system 49, the turnable mirror 56, the semi-transparent mirror 45 and the light collecting lens in the viewer 79 whereby an enlarged image of the film layer 33 is projected on the screen 29. To assure that the projected image is easy to be visually observed by an operator the screen 29 is fitted with a hood 29a as illustrated in FIG. 1.

Since the apparatus of the invention is constructed in the above-described manner, there is necessity for determining the correct position of the material 32 relative to the optical projecting system 28 before the optical measuring system 26 initiates measuring operation of film thickness of the material 32. To this end the turnable mirror 56 is caused to turn to the position as illustrated in FIG. 2 by operating the motor 54 so that the optical axis of the second optical system 49 is intersected with the optical axis of the optical projecting system 28 at a right angle relative to the latter. Thus, light beam coming from the optical projecting system 28 is introduced into the turnable mirror 56 in the form of parallel light beam via the collimator lens.

This parallel light beam is emitted toward the material 32 placed on the sample stage 24 via the second optical system 49 and the objective lens 34 of which magnification can be changed as required.

After light beam has reached the material 32, it is then reflected at the surface of the film layer 33 and reflected light is transmitted to the screen 29 via the objective lens 34 having a predetermined magnification, the second optical system 49, the turnable mirror 56 and the semi-transparent mirror 45 whereby an enlarged image of the film layer 33 is projected on the screen 29. Thus, by adjustably displacing the sample stage 24 while visually observing the image of the film layer 33 an operator can set the film layer 33 at the required position where film thickness is to be measured.

Next, the motor 54 is rotated and thereby the turnable mirror 56 is caused to turn away from the optical projecting system 28 whereby light beam generated by the light source in the first optical system 36 is spectrally transformed to monochromatic light by means of the monochromator 42 in the optical measuring system 26. Now, film thickness of the material 32 can be measured by utilizing reflection interference of monochromatic light on the film layer 33 of the material 32.

As will be readily understood from the above description, focussing of an image of the film layer and determining of a required position for the material 32 can be achieved easily and exactly by utilizing a combination of the optical projecting system and the viewer system, because the apparatus of the invention is equipped with the optical projecting system having a turnable mirror provided therefor in addition to the optical measuring system. Further, since the screen on the viewer has a wide visual area and observation of the film layer and determination of the required position are carried out while comparatively watching the enlarged image on the screen and the material placed on the sample stage, any small sample material having, for instance, a diameter of 1/100 mm can be easily handled without occurrence of physical fatigue.

While the present invention has been described above merely with respect to a single preferred embodiment of the invention, it should of course be understood that various changes or modifications may be made in any acceptable manner without any departure from the spirit and scope of the invention as defined by the appended claims.

What is claimed is:

1. An apparatus for measuring the thickness of a film on certain material essentially comprising a first light source for generating light beam to be emitted, a first optical system for collecting thus emitted light beam, a monochromator for spectrally transforming thus collected light beam in said first optical system to monochromatic light, a second optical system for transmitting monochromatic light to be emitted to the surface of the film layer on the material, a photomultiplier tube for outputting photoelectric current in proportion to the intensity of incident light reflected from the surface of the film layer, and an optical projecting system comprising a third optical system optically associated with the second optical system, a second light source which is provided in the third optical system adapted to emit light beam to the surface of the film layer and a viewer for projecting an image of the film layer on the material in an enlarged scale by utilizing reflected light from the surface of the film layer.

2. An apparatus as defined in claim 1, wherein a turnable mirror is disposed in the second optical system at the position where the optical axis of the first optical system is intersected with the optical axis of the optical projecting system at a right angle relative to the second optical system so that the optical projecting system is optically associated with the second optical system.

3. An apparatus as defined in claim 2, wherein said turnable mirror is actuated by means of a motor which is disposed outside the second optical system.

4. An apparatus as defined in claim 2, wherein said turnable mirror is actuated in such a manner that the optical axis of the first optical system is oriented toward the film layer on the material when measuring of film thickness is to be achieved.

5. An apparatus as defined in claim 2, wherein said turnable mirror is actuated in such a manner that the optical axis of the optical projecting system is intersected with the optical axis of the second optical system at a right angle relative to the second optical system when an image of the film layer is to be projected on the viewer.

* * * * *